US009025597B2

(12) United States Patent
Feng et al.

(10) Patent No.: US 9,025,597 B2
(45) Date of Patent: May 5, 2015

(54) METHODS AND APPARATUS FOR PROVIDING ONE-ARM NODE CLUSTERING USING A PORT CHANNEL

(75) Inventors: Chao Feng, San Jose, CA (US); Nitesh G. Soni, San Jose, CA (US); Pramod Cherukumilli, Belmont, CA (US); Diheng Qu, Palo Alto, CA (US); Suresh Kumar Nalluru, San Jose, CA (US); Samar Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 13/427,274

(22) Filed: Mar. 22, 2012

(65) Prior Publication Data

US 2013/0250952 A1   Sep. 26, 2013

(51) Int. Cl.
*H04L 12/28* (2006.01)
*H04L 29/08* (2006.01)

(52) U.S. Cl.
CPC .................................. *H04L 67/1027* (2013.01)

(58) Field of Classification Search
USPC ......... 370/400, 219, 241, 235, 229, 357, 389, 370/401, 412
See application file for complete search history.

(56) References Cited

U.S. PATENT DOCUMENTS

| 6,208,644 | B1 * | 3/2001 | Pannell et al. | 370/389 |
|---|---|---|---|---|
| 6,331,984 | B1 * | 12/2001 | Luciani | 370/401 |
| 6,910,149 | B2 * | 6/2005 | Perloff et al. | 714/4.3 |
| 7,099,337 | B2 * | 8/2006 | Pinto | 370/400 |
| 7,146,452 | B2 * | 12/2006 | Brocco et al. | 710/312 |
| 7,580,417 | B2 * | 8/2009 | Ervin et al. | 370/397 |
| 7,623,455 | B2 * | 11/2009 | Hilla et al. | 370/232 |
| 7,756,029 | B2 * | 7/2010 | Licardie et al. | 370/230.1 |
| 7,912,091 | B1 * | 3/2011 | Krishnan et al. | 370/490 |
| 2004/0133693 | A1 * | 7/2004 | Wils et al. | 709/230 |
| 2006/0143300 | A1 * | 6/2006 | See et al. | 709/227 |
| 2011/0134925 | A1 * | 6/2011 | Safrai et al. | 370/395.53 |
| 2012/0106339 | A1 * | 5/2012 | Mishra et al. | 370/235 |
| 2012/0257631 | A1 * | 10/2012 | Nguyen | 370/400 |

\* cited by examiner

*Primary Examiner* — Ricky Ngo
*Assistant Examiner* — Dewanda Samuel
(74) *Attorney, Agent, or Firm* — Meunier Carlin & Curfman, LLC

(57) ABSTRACT

Methods and apparatus for providing one-arm node clustering using a port channel are provided herein. An example application node may be communicatively connected to at least one application node, and the application node may be connected to a network through a port channel. The application node may include: a link included in the port channel for accommodating the network data being communicated between the remote client and server; and a processor configured to send/receive a cluster control packet to/from the at least one application node through the link included in the port channel.

17 Claims, 6 Drawing Sheets

METHODS AND APPARATUS FOR PROVIDING ONE-ARM NODE CLUSTERING USING A PORT CHANNEL

BACKGROUND

It may be desirable to provide a network application service by bundling multiple application nodes to achieve high scalability. Each application node (i.e., an appliance form factor or service module) may run an identical policy suite and maintain a coherent running state. By clustering application nodes, it may be possible to aggregate the resources of the cluster to accommodate heavier system load. For example, an application cluster including n-active nodes may achieve close-to-nX performance. The application cluster may be provided between a remote client and server. In some implementations, the application cluster may provide a network application service such as a firewall, for example. Network traffic flowing between the remote client and server may be intercepted by the application cluster and inspected by one of the application nodes before a service is performed on the network traffic. When the network application service is a firewall, the application node may enforce security rules and either forward or drop the intercepted packet, for example.

The application nodes may be bundled using a port channel for network traffic. In a port channel, a plurality of network ports are bundled into a group (i.e., a single logical port channel), which provides increased bandwidth and redundancy. The port channel remains operational as long as a single network port within the port channel is operational. In addition, a hashing algorithm may be used to determine which network port within the port channel should receive the packet. It is also possible to provide load-balancing among the application nodes using the hashing algorithm.

Many network application services require incoming and return packets for the same TCP session to be handled by the same application node. This is known as symmetric flow persistence. To ensure symmetric flow persistence, the application nodes may designate a control link VLAN for accommodating control traffic (i.e., communication among member nodes) such as packet forwarding, flow state replication, etc. In other words, the port channel may accommodate the network traffic flowing between the remote client and server and the control link VLAN may accommodate the control traffic flowing among the member nodes. When a control link VLAN is provided in addition to the port channel, each application node divides the available network resources at the network interface controller (NIC). In particular, the available bandwidth is allocated between the port channel and the control link VLAN. However, it is difficult to allocate the proper amount of bandwidth to the control link VLAN because many factors contribute to how much control traffic flows among the member nodes. If too much bandwidth is allocated to the control link VLAN, the total available bandwidth is underutilized. On the other hand, if too little bandwidth is allocated, the control link VLAN becomes saturated, which degrades the effective bandwidth of the cluster. In addition, when each application node includes a link within the port channel and a link within the control link VLAN, each application node is more susceptible to failure because failure may result from failure of either link.

SUMMARY

Methods and apparatus for providing one-arm node clustering using a port channel are provided herein. An example application node may be communicatively connected to at least one application node, and the application node may be connected to a network through a port channel. The application node may include: a link included in the port channel for accommodating the network data being communicated between the remote client and server; and a processor configured to send/receive a cluster control packet to/from the at least one application node through the link included in the port channel. The cluster control packet may include a payload that synchronizes flow between the application node and the at least one application node.

Optionally, the processor may be configured to: receive a first instance of the network data through the link included in the port channel; and forward the first instance of the network data through the link included in the port channel as the cluster control packet. For example, the first instance of the network data may be the payload.

In addition, the processor may be configured to: receive a second instance of the network data through the link included in the port channel; and provide the application service on the second instance of the network data.

Alternatively or additionally, the processor may be further configured to: generate flow state replication data; and forward the flow state replication data to the at least one application node through the link included in the port channel as the cluster control packet. For example, the flow state replication data may be the payload.

In some implementations, the application node may only be connected to the network through the port channel. Accordingly, the network data and the cluster control packet may be communicated over the port channel.

In another implementation, the processor may be configured to encapsulate the cluster control packet with MAC-in-MAC (MiM) fields. For example, the MiM fields may include a destination MAC address and a source MAC address.

In yet another implementation, the cluster control packet may include an outer destination MAC address field, an outer source MAC address field, a destination address field and a source address field. In addition, the destination and source address fields may be dummy addresses or original destination and source addresses of a forwarded packet.

One of ordinary skill in the art would understand that the above-described subject matter may also be implemented as a method, a computer process, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for providing a network application service, such as a firewall, using an application cluster, it will become evident to those skilled in the art that the implementations are not limited thereto, but are applicable for providing any network application service using cluster of application nodes.

Figure 1:
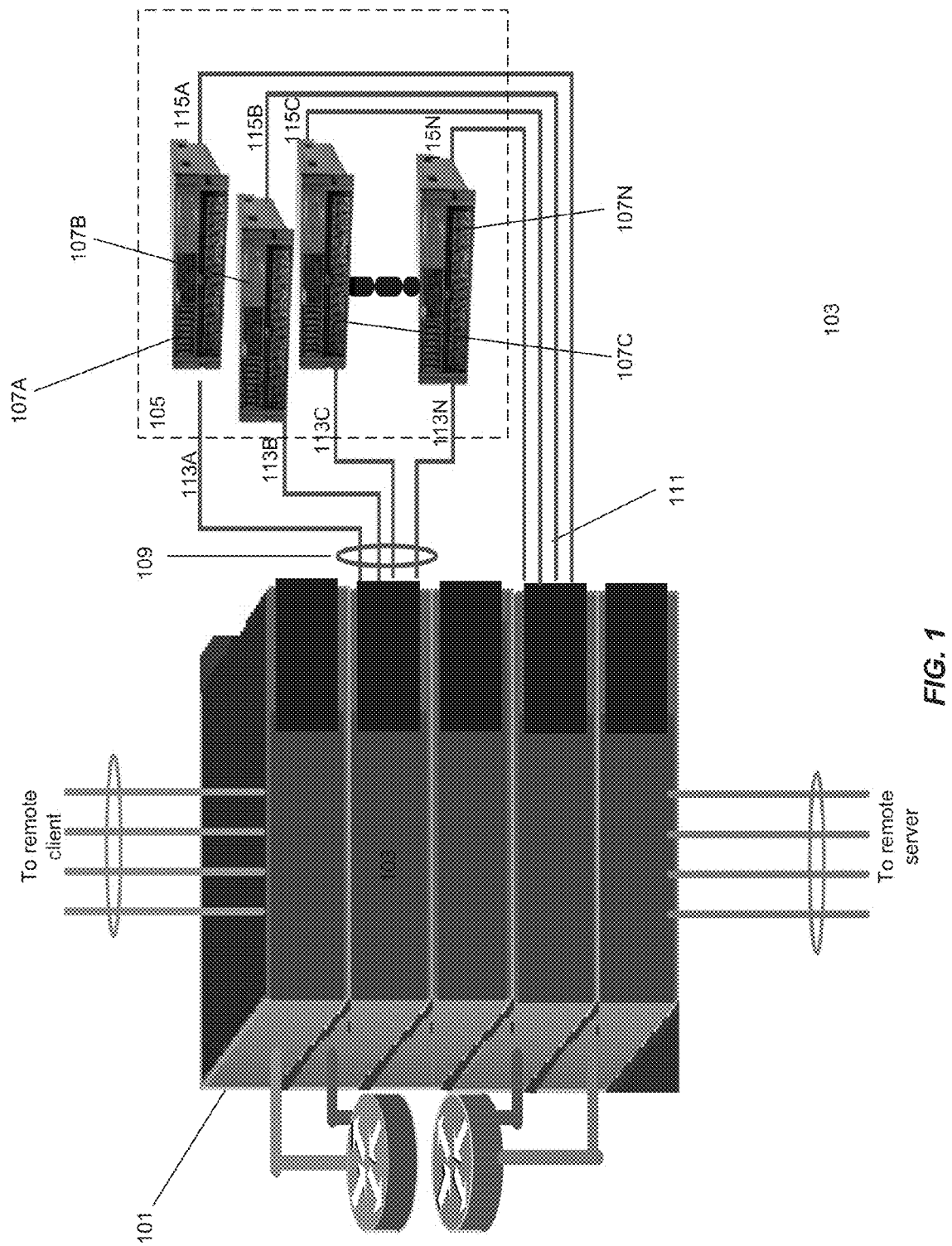
FIG. 1 illustrates an example system for providing a network application service with a cluster of application nodes.

Referring to FIG. 1, an example system for providing a network application service using a cluster of application nodes is shown. The system may include a network stack 101 housing a plurality of network devices such as switches, routers, hubs, bridges, etc. In FIG. 1, the network stack 101 may include a switch 103, for example. An application cluster 105 may include a plurality of application nodes 107A, 107B, 107C, 107N. Although the application cluster 105 shown in FIG. 1 includes four application nodes, more or less than four application nodes may be included in other implementations. The application cluster 105 may be provided between a remote client and server. The remote client and server may be connected to the application cluster 105 through a network, such as a LAN, WAN or MAN, for example. The remote client and server may be connected to the network through any type of connection including, but not limited to Ethernet, Wi-Fi, WiMAX, 3G or 4G. In addition, the remote client and server and application nodes 107A, 107B, 107C, 107N may be implemented as the computing device discussed with regard to FIG. 6.

By providing the application cluster 105 between the remote client and server, one of the application nodes 107A, 107B, 107C or 107N may intercept network traffic flowing between the remote client and server. For example, one of the application nodes 107A, 107B, 107C or 107N may intercept a packet flowing between the remote client and server in order to perform an application service on the packet. The application cluster 105 (and the application service it performs), however, may be transparent to the remote client and server. In particular, the application cluster 105 may provide a network service, such as a firewall, for example. Each of the application nodes 107A, 107B, 107C, 107N within the application cluster 105 may run an identical security policy suite and may maintain a coherent running state as compared to the other application nodes. Alternatively, each of the application nodes 107A, 107B, 107C, 107N may cover a different set of security policies and act as a stand-by node to the other application nodes on the policies it does not actively perform. Accordingly, when the application cluster 105 provides a firewall as the application service, one of the application nodes 107A, 107B, 107C or 107N may intercept and inspect packets flowing between the remote client and server. The application node 107A, 107B, 107C or 107N may then enforce a set of security policies and either forward or drop the packets.

Each of the application nodes 107A, 107B, 107C, 107N within the application cluster 105 may be connected to the switch 103 through a port channel 109. The port channel 109 provides a means for bundling individual interfaces into a group to provide increased bandwidth and redundancy. For example, a plurality of interfaces (or ports) of the switch 103 may be bundled into the port channel 109, which acts as a single logical channel to which each of the application nodes 107A, 107B, 107C, 107N are connected. Specifically, as shown in FIG. 1, links 113A, 113B, 113C, 113N may be bundled in the port channel 109. The port channel 109 provides increased bandwidth because the bandwidth of the links may be aggregated. In addition, the port channel 109 provides increased redundancy because only one of the links 113A, 113B, 113C, 113N needs to remain operational for the port channel 109 to remain operational. The switch 103 may utilize a hashing algorithm to determine over which of the links 113A, 113B, 113C, 113N to send network data. In addition, it may be possible to provide load-balancing among the links 113A, 113B, 113C, 113N using the hashing algorithm.

The application service provided by the application cluster 105 may require that incoming and return network traffic be handled by the same application node 107A, 107B, 107C or 107N, which is known as symmetric flow persistence. In particular, the application service may require that the incoming and return packets for the same TCP session be handled by the same application node 107A, 107B, 107C or 107N. For example, when the application nodes 107A, 107B, 107C, 107N are connected to the switch 103 through the port channel 109, an incoming packet flowing between the remote client and server may be handled by application node 107A. Application node 107A may perform the network service on the incoming packet and subsequently forward the incoming packet to its destination over the port channel 109. In addition, application node 107A may save the TCP flow in a flow table, which may be synchronized with the other application nodes of the application cluster 105. Thereafter, a return packet flowing between the remote client and server, which is part of the same TCP session as the incoming packet, may be received by application node 107B over the port channel 109 (i.e., through link 113B). In order to maintain symmetric flow persistence, the return packet may preferably be forwarded from application node 107B to application node 107A.

However, it may not be possible to forward the return packet from application node 107B to application node 107A using the port channel 109. In particular, the switch 103 prevents data communication from flowing among application nodes 107A, 107B, 107C, 107N connected to the port channel 109 because such data communication is considered a loop. Therefore, the self forwarding check or the self forward check, which may be implemented by an ASIC of the network controller of the switch 103, may cause the return packet to be dropped if the return packet is forwarded over the port channel 109. Accordingly, in order to provide symmetric flow persistence, a control link VLAN 111 may be provided to accommodate data communication among application nodes 107A, 107B, 107C, 107N including data regarding packet forwarding, packet duplication, flow state replication and any other data communicated among the application nodes 107A, 107B, 107C, 107N. As shown in FIG. 1, links 115A, 115B, 115C, 115N are included in the control link VLAN 111. Application node 107B may therefore forward the return packet to application node 107A using the control link VLAN 111 so that application node 107A may handle both the incoming and return packets from the same TCP session.

When a control link VLAN 111 is provided in addition to the port channel 109, the network resources must be allocated between the control link VLAN 111 and the port channel 109. For example, the total available bandwidth may be allocated between the control link VLAN 111 and the port channel 109 at the NIC of the application node 107A, 107B, 107C or 107N. However, as discussed above, it may be difficult to properly allocate the total available bandwidth because the bandwidth required to accommodate the control traffic among the application nodes 107A, 107B, 107C, 107N depends on many factors, and improper allocation may lead to underutilization of the total bandwidth or degradation of the effective bandwidth.

Figure 2:
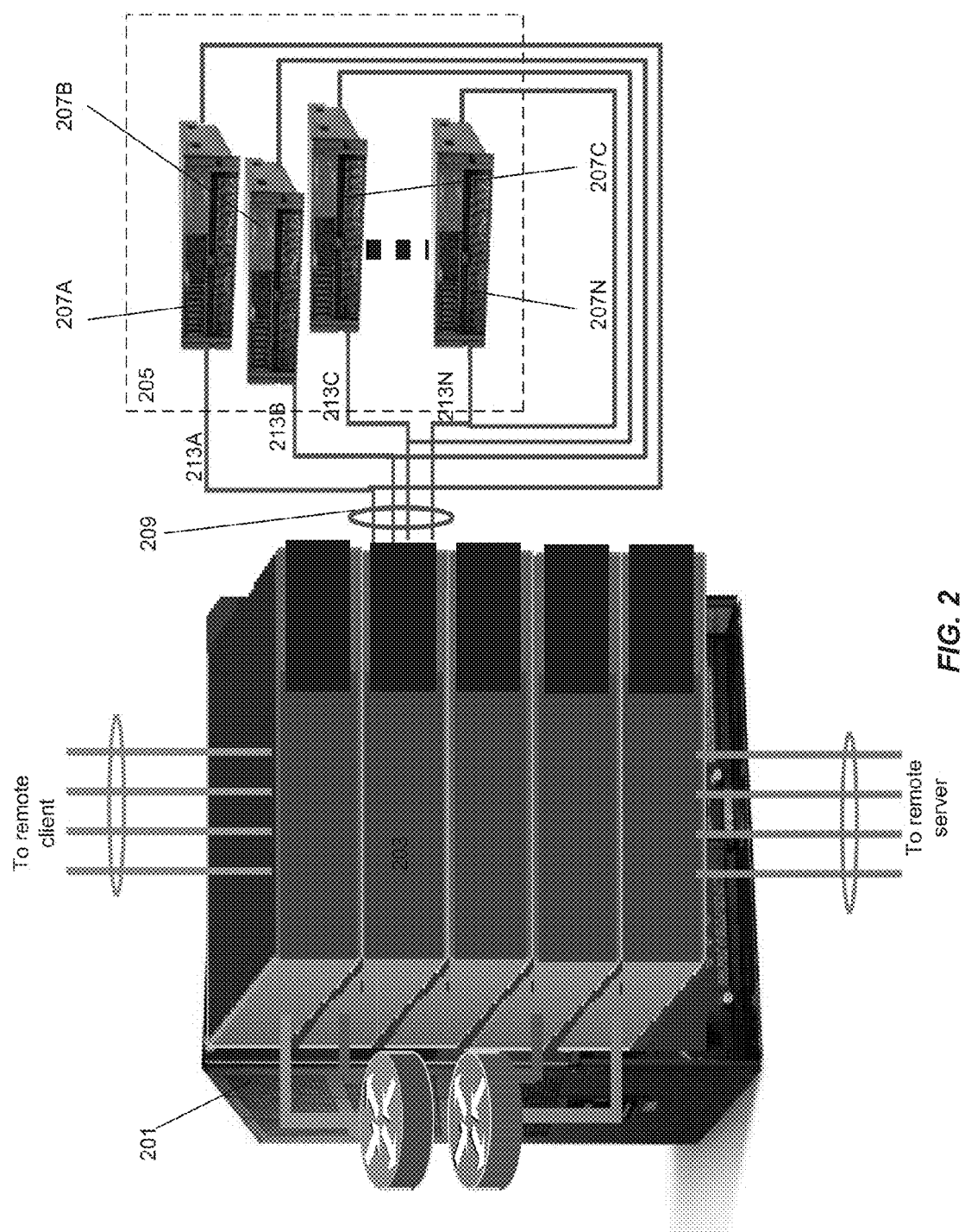
FIG. 2 illustrates another example system for providing a network application service with a cluster of application nodes.

Referring to FIG. 2, another example system for providing a network application service using a cluster of application nodes is shown. The system may include a network stack 201 housing a plurality of network devices such as switches, routers, hubs, bridges, etc. For example, the network stack 201 may include a switch 203. In addition, an application cluster 205 may be provided between a remote client and server. The application cluster 205 may provide a network application service on the network communication flowing between the remote client and server. Additionally, the application cluster 205 may include application nodes 207A, 207B, 207C, 207N. Although the application cluster 205 shown in FIG. 2 includes four application nodes, more or less than four application nodes may be included in other implementations. The remote client and server may be connected to the application cluster 205 through a network, such as a LAN, WAN or MAN, for example. The remote client and server may be connected to the network through any type of connection including, but not limited to Ethernet, Wi-Fi, WiMAX, 3G or 4G. In addition, the remote client and server and application nodes 207A, 207B, 207C, 207N may be implemented as the computing device discussed with regard to FIG. 6.

The system shown in FIG. 2 functions similarly to the system shown in FIG. 1 in many aspects. In contrast to the system shown in FIG. 1, however, the application nodes 207A, 207B, 207C, 207N shown in FIG. 2 are only connected to the switch 203 through the port channel 209. The port channel 209 includes links 213A, 213B, 213C, 213N. Accordingly, the system shown in FIG. 2 does not include a control link VLAN. In other words, each of the application nodes 207A, 207B, 207C, 207N functions as a one-arm node because each of the nodes is only connected to the network through the port channel 209. In addition, the port channel 209 accommodates the network traffic flowing between the remote client and server and the control traffic flowing among the application nodes 207A, 207B, 207C, 207N.

The system shown in FIG. 2 may also require symmetric flow persistence such that incoming and return packets for the same TCP session are handled by the same application node 207A, 207B, 207C or 207N. For example, an incoming packet flowing between the remote client and server may be intercepted, inspected and serviced by application node 207A. After providing the application service, application node 207A may save TCP flows in a flow table and forward the incoming packet to its destination. Thereafter, the return packet, which is part of the same TCP session as the incoming packet, may be received by application node 207B. In order to provide symmetric flow persistence, application node 207B may preferably forward the return packet to application node 207A after determining that the incoming packet from the same TCP session was handled by application node 207A. Unlike the system shown in FIG. 1, the port channel 209 of the system shown in FIG. 2 may accommodate the network traffic flowing between the remote client and server as well as control traffic flowing among the application nodes 207A, 207B, 207C, 207N.

By providing a port channel that accommodates both the network traffic and the control traffic, it is possible to more efficiently utilize available bandwidth and increase reliability. For example, in order to prevent the control link VLAN from becoming saturated, excess bandwidth may be allocated to the control link VLAN, which results in underutilization of the total available bandwidth. However, when the port channel accommodates both the network traffic and the control traffic, the total available bandwidth is allocated to the port channel alone. In addition, each appliance node can join both ports into the same port-channel. If one port fails, the appliance still have both data and control connectivity. Otherwise the appliance would lose either data or control connectivity resulting in a useless node.

Figure 3A:
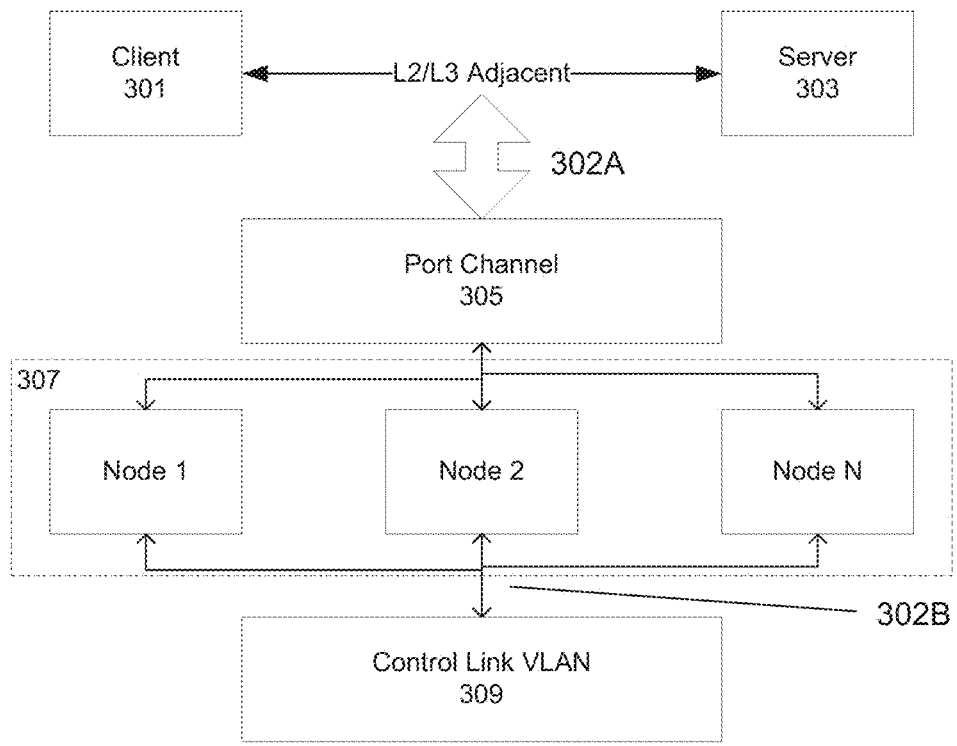
FIGS. 3A and 3B illustrate example logical block diagrams for providing a network application service with a cluster of application nodes.
Figure 3B:
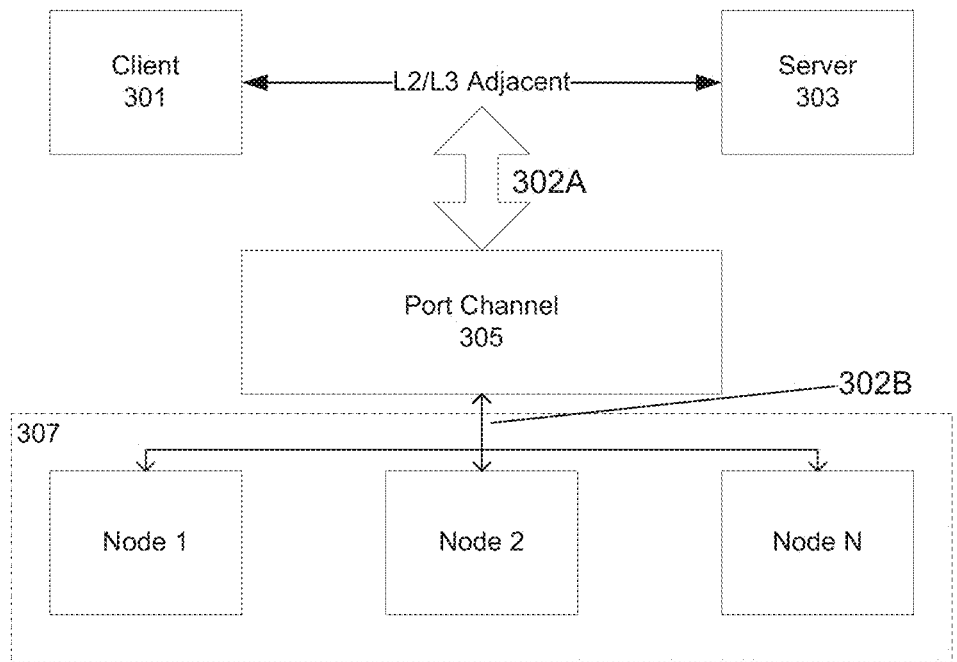

Referring to FIGS. 3A and 3B, example logical block diagrams for providing an application service using a cluster of application nodes are shown. As shown in FIG. 3A, the client 301 and the server 303 may be L2/L3 adjacent. In addition, an application cluster 307 may be provided between the client 301 and the server 303. The application cluster 307 may include Node 1, Node 2 and Node N, for example. Although three nodes are shown in the application cluster 307, it may be possible to provide more or less than three nodes. As discussed above, an application service may be provided on the network traffic (i.e., packets) flowing between the client 301 and the server 303. For example, one of the nodes of the application cluster 307 may intercept, inspect and service a packet flowing between the client 301 and the server 303. This is represented by reference numeral 302A shown in FIG. 3A. As discussed above with regard to FIGS. 1 and 2, one of the nodes of the application cluster 307 receives the packet through the port channel 305. The port channel 305 allows the links to each of the nodes of the application cluster 307 to be bundled into a single logical channel. In addition, a control link VLAN 309 is provided to accommodate control traffic flowing among the nodes of the application cluster 307. For example, the control link VLAN 309 may accommodate a packet forwarded between Node 1 and Node 2 in order to provide symmetric flow persistence. Alternatively or additionally, the control link VLAN 309 may accommodate any data communication flowing among the nodes of the application cluster 307. This is represented by reference numeral 302B shown in FIG. 3A. As discussed above, the control link VLAN 309 is provided because the port channel 305 may not accommodate data communication flowing among the nodes of the application cluster 307. Specifically, the self forwarding check or the self forward check of the network device on which the port channel is configured may prevent data communication among the ports within the port channel. In some implementations, the self forwarding check or the self forward check may be implemented by an ASIC of the network device.

The example block diagram for providing an application service using a cluster of application nodes shown in FIG. 3B is similar to the example block diagram shown in FIG. 3A. Therefore, the features having similar reference numerals will not be discussed in detail with regard to FIG. 3B. Unlike the block diagram shown in FIG. 3A, the block diagram shown in FIG. 3B includes a port channel 305 that accommodates the network traffic flowing between the client 301 in the server 303 as well as the control traffic flowing among the nodes of the application cluster 307. This is represented by reference numerals 302A and 302B shown in FIG. 3B.

Figure 4:
FIG. 4 illustrates an example encapsulated packet according to an implementation of the invention.

Referring to FIG. 4, an example encapsulated packet according to an implementation of the invention is shown. As discussed above, the self forwarding check (or the self forward check) in the port channel prevents a member port from sending a packet to another member port on the port channel. For example, an ASIC of the network device on which the port channel is configured may implement the self forwarding check. Thus, in order to send control traffic among member ports of the port channel, the self forwarding check may be bypassed. One example way to bypass the self forwarding check is by using MAC-in-MAC (MiM) addressing because the ASIC is configured to be disabled for MiM addressing. FIG. 4 illustrates an example encapsulated packet 400. The packet payload 410 may be any data to be communicated among the member ports of the port channel. For example, the packet payload 410 may include flow synchronization data. The encapsulated packet 400 may have an outer address including the outer destination address, which may be the destination MAC address of the destination application node, and the outer source address, which may be the source MAC address of the source application node, for example. In addition, the encapsulated packet 400 may have an inner address including the destination address and the source address. The inner address may be provided with dummy addresses if the payload is an application's meta data, such as flow states, for example. However, if the payload is the original packet payload, the inner address may retain the original packet's source and destination addresses. Accordingly, in order to encapsulate the packet, the application nodes may be configured to encapsulate the payload packet 410 with the outer destination address and the outer source address. For example, the NIC of the application node may be configured to encapsulate the packets. Because the self forwarding check is disabled for MiM addressing, the payload packet 410 may be delivered from one node to another node within the port channel.

Figure 5:
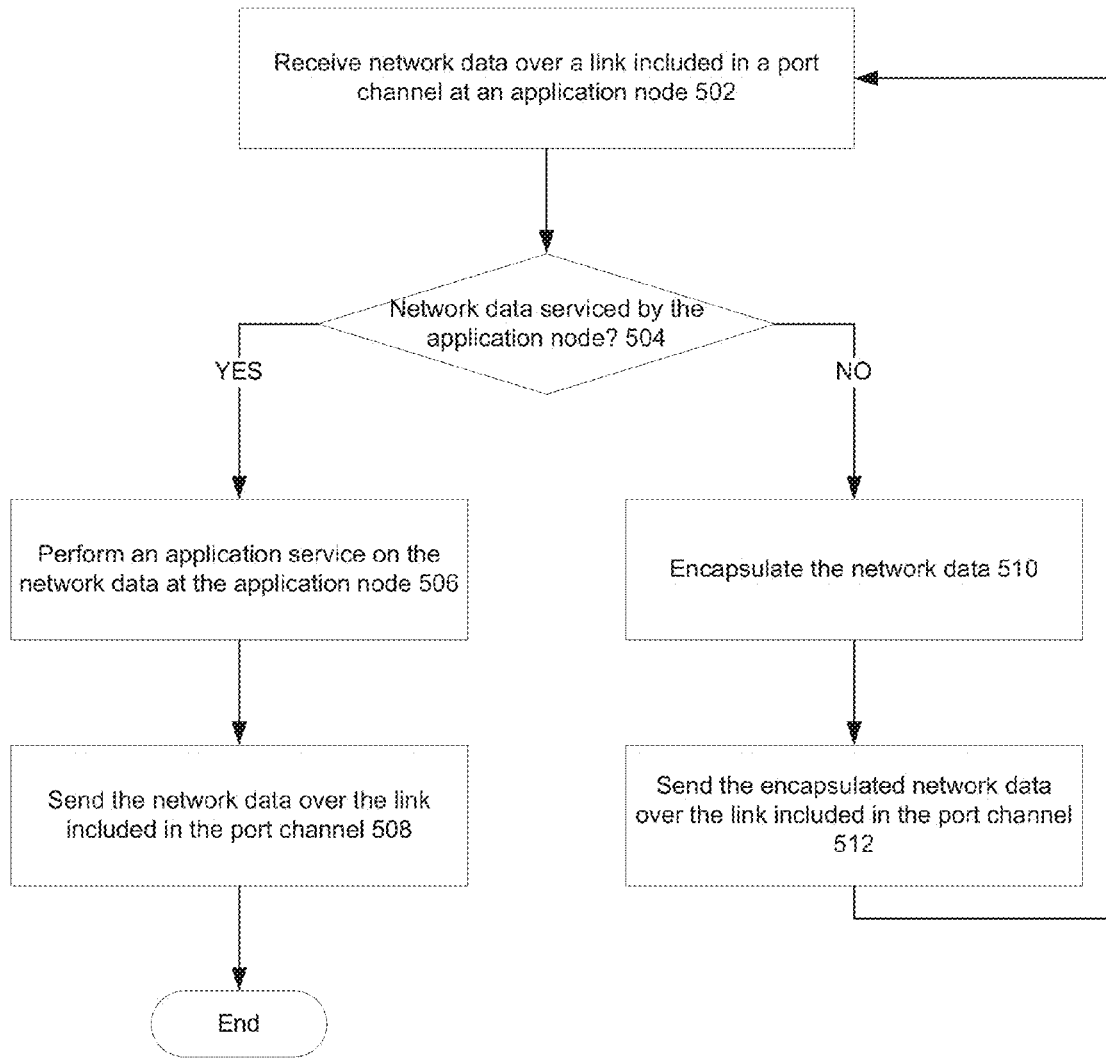
FIG. 5 illustrates example operations for providing a network application service using a cluster of application nodes within the system of FIG. 2.

Referring to FIG. 5, example operations for providing a network application service using a cluster of application nodes is shown. At 502, network data may be received at an application node. The network data may include a packet flowing between a remote client and server, for example. In addition, the application node may be one of a plurality of application nodes in an application cluster. The application cluster may provide a network application service on the network data. The network data may be received at the application node over a link in a port channel. As discussed above, the port channel may include a plurality of network ports (i.e., links) bundled into a single logical channel. Accordingly, the port channel may include the links to each of the application nodes.

An 504, a determination is made by the application node as to whether the network data should be serviced by the application node. For example, in order to provide symmetric flow persistence, an application service may require that incoming and return packets from the same TCP session be handled by the same application node. However, when using a port channel, a return packet may be received by an application node that did not handle the incoming packet from the same TCP session. Accordingly, the return packet may preferably be forwarded to the application node that handled the incoming packet. This determination may be made by referring to a flow table, for example.

If the application node should service the network data, the application node may perform the application service on the network data at 506. Thereafter, at 508, the network data may be sent to its destination over the port channel. Optionally, the application node may also save the TCP flow to a flow table. If the application node should not service the network data, the application node may encapsulate the network data at 510. For example, when the network data is a return packet related to a TCP session that was handled by a different application node, the network data may preferably be forwarded to the application node that handled the incoming packet. The network data may be encapsulated using MiM addressing (i.e., provided with an outer destination MAC address and an outer source MAC address), for example. At 512, the application node may send the encapsulated over the port channel. Because the network data is encapsulated using MiM addressing, the encapsulated network data may bypass the self forwarding check.

The operations of FIG. 5 are related to forwarding packets received by one member node to another member node within the application cluster over the port channel. However, one of ordinary skill in the art would understand that the application node may be configured to encapsulate and forward any data over the port channel to another member node within the application cluster. For example, the application node may generate flow replication data, encapsulate the flow replication data and forward the flow replication data over the port channel to another member node. In other words, the encapsulated data may be cluster control data as well as network data.

Figure 6:
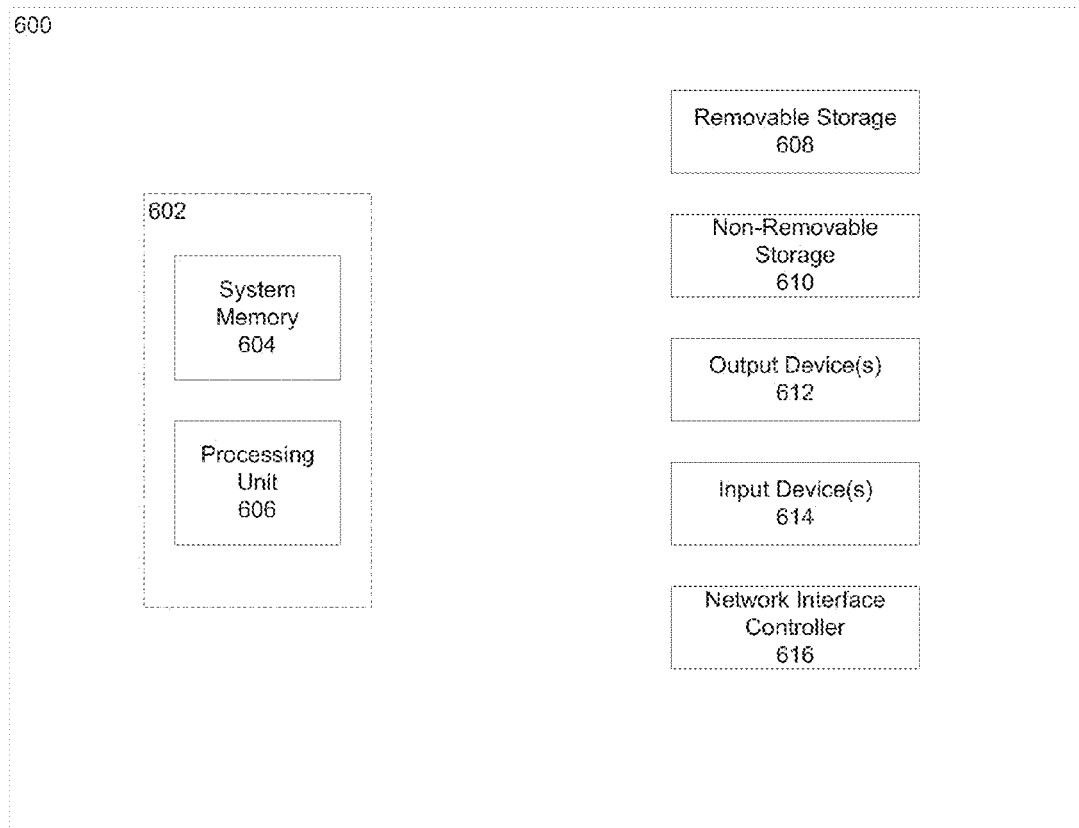
FIG. 6 illustrates an example computing device.

Referring to FIG. 6, an example computing device is illustrated. The client, server and/or application node discussed above may be computing devices, such as computing device 600 shown in FIG. 6. In its most basic configuration, computing device 600 typically includes at least one processing unit 606 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 602. The processing unit may be a standard programmable processor that performs arithmetic and logic operations necessary for operation of the computing device 600.

The processing unit 606 may be configured to execute program code encoded in tangible, computer-readable media. For example, the processing unit 606 may execute program code stored in the system memory 604.

Computing device 600 may have additional features/functionality. For example, computing device 600 may include additional storage such as removable storage 608 and non-removable storage 610 including, but not limited to, magnetic or optical disks or tapes. Computing device 600 may also contain a network interface controller 616 that allow the device to communicate with other devices. In some implementations, the network interface controller 616 may include its own processor and memory. The processor of the network interface controller may be a standard programmable processor or a processor configured to implement a specific function. Computing device 600 may also have input device(s) 614 such as a keyboard, mouse, touch screen, etc. Output device(s) 614 such as a display, speakers, printer, etc. may also be included. All these devices are well known in the art and need not be discussed at length here.

Computing device 600 typically includes a variety of computer readable media. Computer readable media can be any available media that can be accessed by device 600 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

It should be understood that the various techniques described herein may be implemented in connection with hardware, firmware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although of the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An application node communicatively connected to at least one application node for providing a clustered application service on network data flowing between a remote client and server, the application node being connected to a network through a port channel, the application node comprising:

a link included in the port channel, the network data being sent or received by the application node through the link, the network data including data communicated between the remote client and server; and a processor configured to:

send or receive a cluster control packet to or from the at least one application node through the link included in the port channel, wherein the cluster control packet comprises a payload that synchronizes flow between the application node and the at least one application node, and wherein the port channel comprises a plurality of links bundled as a logical channel;

receive a first instance of the network data through the link included in the port channel; and forward the first instance of the network data through the link included in the port channel as the cluster control packet, wherein the first instance of the network data comprises the payload.

2. The application node of claim 1, wherein the processor is further configured to:

receive a second instance of the network data through the link included in the port channel; and provide the clustered application service on the second instance of the network data.

3. The application node of claim 1, wherein the processor is further configured to:

generate flow state replication data; and forward the flow state replication data to the at least one application node through the link included in the port channel as the cluster control packet, wherein the flow state replication data comprises the payload.

4. The application node of claim 1, wherein the application node is only connected to the network through the port channel, the network data and the cluster control packet being communicated over the port channel.

5. The application node of claim 1, wherein the processor is further configured to encapsulate the cluster control packet with MAC-in-MAC (MiM) fields.

6. The application node of claim 5, wherein the MiM fields comprise a destination MAC address and a source MAC address.

7. The application node of claim 1, wherein the cluster control packet further comprises an outer destination MAC address field, an outer source MAC address field, a destination address field and a source address field, wherein the destination and source address fields comprise dummy addresses or original destination and source addresses of a forwarded packet.

8. A method for providing a clustered application service on network data flowing between a remote client and server using an application node communicatively connected to at least one application node, the application node being connected to a network through a port channel, the method comprising:

sending or receiving the network data through the port channel, the network data including data communicated between the remote client and server;

sending or receiving a cluster control packet to or from the at least one application node through the port channel, wherein the cluster control packet comprises a payload that synchronizes flow between the application node and the at least one application node, and wherein the port channel comprises a plurality of links bundled as a logical channel;

receiving a first instance of the network data through the port channel; and forwarding the first instance of the network data through the port channel as the cluster control packet, wherein the first instance of the network data comprises the payload.

9. The method of claim 8, further comprising:

receiving a second instance of the network data through the port channel; and providing the clustered application service on the second instance of the network data.

10. The method of claim 8, further comprising:

generating flow state replication data; and forwarding the flow state replication data to the at least one application node through the port channel as the cluster control packet, wherein the flow state replication data comprises the payload.

11. The method of claim 8, further comprising encapsulating the cluster control packet with MAC-in-MAC (MiM) fields.

12. The method of claim 11, wherein the MiM fields comprise a destination MAC address and a source MAC address.

13. The method of claim 8, wherein the cluster control packet further comprises an outer destination MAC address field, an outer source MAC address field, a destination address field and a source address field, wherein the destination and source address fields comprise dummy addresses or original destination and source addresses of a forwarded packet.

14. A non-transitory computer-readable recording medium having computer-executable instructions stored therein for providing a clustered application service on network data flowing between a remote client and server using an application node that is connected to a network through a port channel and communicatively connected to at least one application node that, when executed by a processor of the application node, cause the processor to:

send or receive the network data through the port channel, the network data including data communicated between the remote client and server;

send or receive a cluster control packet to or from the at least one application node through the port channel, wherein the cluster control packet comprises a payload that synchronizes flow between the application node and the at least one application node, and wherein the port channel comprises a plurality of links bundled as a logical channel;

receive a first instance of the network data through the port channel; and forward the first instance of the network data through the port channel as the cluster control packet, the first instance of network data comprising the payload.

15. The non-transitory computer-readable recording medium of claim 14, having further computer-executable instructions stored therein that, when executed by the processor, cause the processor to:

generate flow state replication data; and forward the flow state replication data to the at least one application node through the port channel as the cluster control packet, wherein the flow state replication data comprises the payload.

16. The non-transitory computer-readable recording medium of claim 14, having further computer-executable instructions stored therein that, when executed by the processor, cause the processor to encapsulate the cluster control packet with MAC-in-MAC (MiM) fields, wherein the MiM fields comprise a destination MAC address and a source MAC address.

17. The non-transitory computer-readable recording medium of claim 14, wherein the cluster control packet further comprises an outer destination MAC address field, an outer source MAC address field, a destination address field and a source address field, wherein the destination and source address fields comprise dummy addresses or original destination and source addresses of a forwarded packet.

* * * * *